US010262546B2

(12) United States Patent
Cabello

(10) Patent No.: US 10,262,546 B2
(45) Date of Patent: Apr. 16, 2019

(54) AIRCRAFT NAVIGATION USING EXPONENTIAL MAP

(71) Applicant: GE Aviation Systems LLC, Grand Rapids, MI (US)

(72) Inventor: Juan Jose Cabello, Queretaro (MX)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 27 days.

(21) Appl. No.: 15/097,330

(22) Filed: Apr. 13, 2016

(65) Prior Publication Data

US 2017/0301245 A1    Oct. 19, 2017

(51) Int. Cl.
| | | |
|---|---|---|
| G06G 5/00 | (2006.01) | |
| G08G 5/00 | (2006.01) | |
| G01S 19/43 | (2010.01) | |
| G01S 19/47 | (2010.01) | |
| G01S 19/51 | (2010.01) | |
| G01C 21/20 | (2006.01) | |

(52) U.S. Cl.
CPC ........... *G08G 5/0047* (2013.01); *G01C 21/20* (2013.01); *G01S 19/43* (2013.01); *G01S 19/47* (2013.01); *G01S 19/51* (2013.01); *G08G 5/003* (2013.01)

(58) Field of Classification Search
CPC .............................. G08G 5/0047; G01S 19/43
See application file for complete search history.

(56) References Cited

U.S. PATENT DOCUMENTS

| | | | | |
|---|---|---|---|---|
| 5,850,197 A | * | 12/1998 | Schipper ............... | G01S 5/0247 342/417 |
| 6,029,111 A | * | 2/2000 | Croyle ................. | G01C 21/165 701/468 |
| 6,166,684 A | * | 12/2000 | Yoshikawa ............ | B64G 1/242 342/357.34 |
| 6,178,379 B1 | * | 1/2001 | Dwyer .................... | G01S 19/15 244/175 |
| 6,650,287 B1 | | 11/2003 | Karpov et al. | |

(Continued)

OTHER PUBLICATIONS

Berndsen, "Development of a Robotic Arm Suitable for Practicing Control Algorithms Taught in the Course Modern Robotics", pp. 1-27, Jan. 1, 2016.

(Continued)

*Primary Examiner* — Alex C Dunn
(74) *Attorney, Agent, or Firm* — General Electric Company; William Andes

(57) ABSTRACT

Systems and methods for determining navigation information for an aircraft are provided. In one embodiment, a method can include accessing a satellite-based positioning signal received at a receiver on an aircraft. The satellite-based positioning signal can be indicative of a distance between a satellite and the receiver. The method can include identifying from the satellite-based positioning signal a first vector associated with a distance between the satellite and the receiver and identifying a second vector from the satellite-based positioning signal associated with a distance between a reference point and the satellite. The method can include generating a kinematic model for determining a geometric position of the aircraft based at least in part on a robotic arm using the first vector and the second vector and determining navigation information for the aircraft based at least in part on the kinematic model.

17 Claims, 6 Drawing Sheets

(56) References Cited

U.S. PATENT DOCUMENTS

| | | | | |
|---|---|---|---|---|
| 7,788,034 B2* | 8/2010 | Bui | | G05D 1/12 |
| | | | | 701/1 |
| 8,065,044 B2* | 11/2011 | Jump | | G05D 1/101 |
| | | | | 244/180 |
| 8,214,111 B2* | 7/2012 | Heiniger | | A01B 69/008 |
| | | | | 701/408 |
| 8,265,826 B2* | 9/2012 | Feller | | A01B 69/007 |
| | | | | 701/41 |
| 8,543,261 B2* | 9/2013 | Anderson | | B60W 30/09 |
| | | | | 701/3 |
| 8,548,649 B2* | 10/2013 | Guyette | | A01B 79/005 |
| | | | | 111/170 |
| 8,594,879 B2* | 11/2013 | Roberge | | A01B 69/007 |
| | | | | 701/23 |
| 9,477,230 B2* | 10/2016 | Sastre I Sastre | | G01C 11/02 |
| 2010/0280699 A1* | 11/2010 | Bageshwar | | G05D 1/0231 |
| | | | | 701/26 |
| 2011/0153250 A1* | 6/2011 | Bailey | | G01C 17/38 |
| | | | | 702/94 |
| 2011/0257927 A1* | 10/2011 | Bharadwaj | | G01C 21/165 |
| | | | | 702/150 |
| 2013/0002857 A1* | 1/2013 | Kulik | | G01C 17/38 |
| | | | | 348/135 |
| 2014/0336929 A1 | 11/2014 | Wellington | | |
| 2015/0286893 A1* | 10/2015 | Straub | | G06K 9/52 |
| | | | | 382/154 |
| 2015/0314869 A1* | 11/2015 | Lemus Martin | | B64C 39/024 |
| | | | | 701/3 |
| 2015/0341753 A1* | 11/2015 | Chen | | H04W 4/04 |
| | | | | 455/456.1 |
| 2017/0018192 A1* | 1/2017 | Borgyos | | G08G 5/0039 |

OTHER PUBLICATIONS

European Search Report and Opinion issued in connection with corresponding EP Application No. 17166184.6 dated Sep. 6, 2017.

* cited by examiner

AIRCRAFT NAVIGATION USING EXPONENTIAL MAP

FIELD OF THE INVENTION

The present subject matter relates generally to aircraft navigation.

BACKGROUND OF THE INVENTION

Aircraft often employ flight management systems to assist with navigating aircraft in a manner to save time, fuel, etc. in traveling from an origin to a destination. A navigation solution implemented by a flight management system can process signals from various sources (e.g., GPS satellites, attitude sensors, etc.) to determine a velocity and attitude (e.g., orientation) of the aircraft during flight. In some examples, the attitude and the translation (e.g., position and velocity) of the aircraft are determined separately using separate algorithms. For instance, position and velocity can be determined by processing GPS signals (or other satellite based positioning signals). Attitude can be determined using various attitude sensors, such as inertial measurement units (IMUS) and/or other signal receivers.

Flight management systems often implement navigation solutions that take into account geodesic factors, such as magnetic variation of the Earth, which can vary in magnitude and direction as the magnetic field is ever changing. In addition, flying by the poles can involve a wander angle (e.g., angle with respect to north) having a 90° angle which induces a computational error because a trigonometric tangent function is used, and the tangent of 90' is considered infinity. This can be addressed using parameterization methods, leading to complex computations and expensive hardware components to implement navigation solutions for the aircraft.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a computer-implemented method of determining navigation information for an aircraft. The method includes accessing, by one or more processors, a satellite-based positioning signal received at a receiver on an aircraft. The satellite-based positioning signal can include data indicative of a distance between a satellite and the receiver. The method can further includes identifying, by the one or more processors, from the satellite-based positioning signal a first vector associated with the distance and direction between the satellite and the receiver and identifying, by the one or more processors, from the satellite-based positioning signal a second vector associated with a distance and direction between a reference point, usually the center of the Earth, and the satellite. The method can further include generating, by the one or more processors, a kinematic model for determining a geometric position of the aircraft using the first vector and the second vector. The kinematic model can be based at least in part on a robotic arm; and determining, by the one or more processors, navigation information for the aircraft based at least in part on the kinematic model.

Other example aspects of the present disclosure are directed to systems, methods, aircrafts, avionics systems, devices, non-transitory computer-readable media for determining navigation information for an aircraft. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
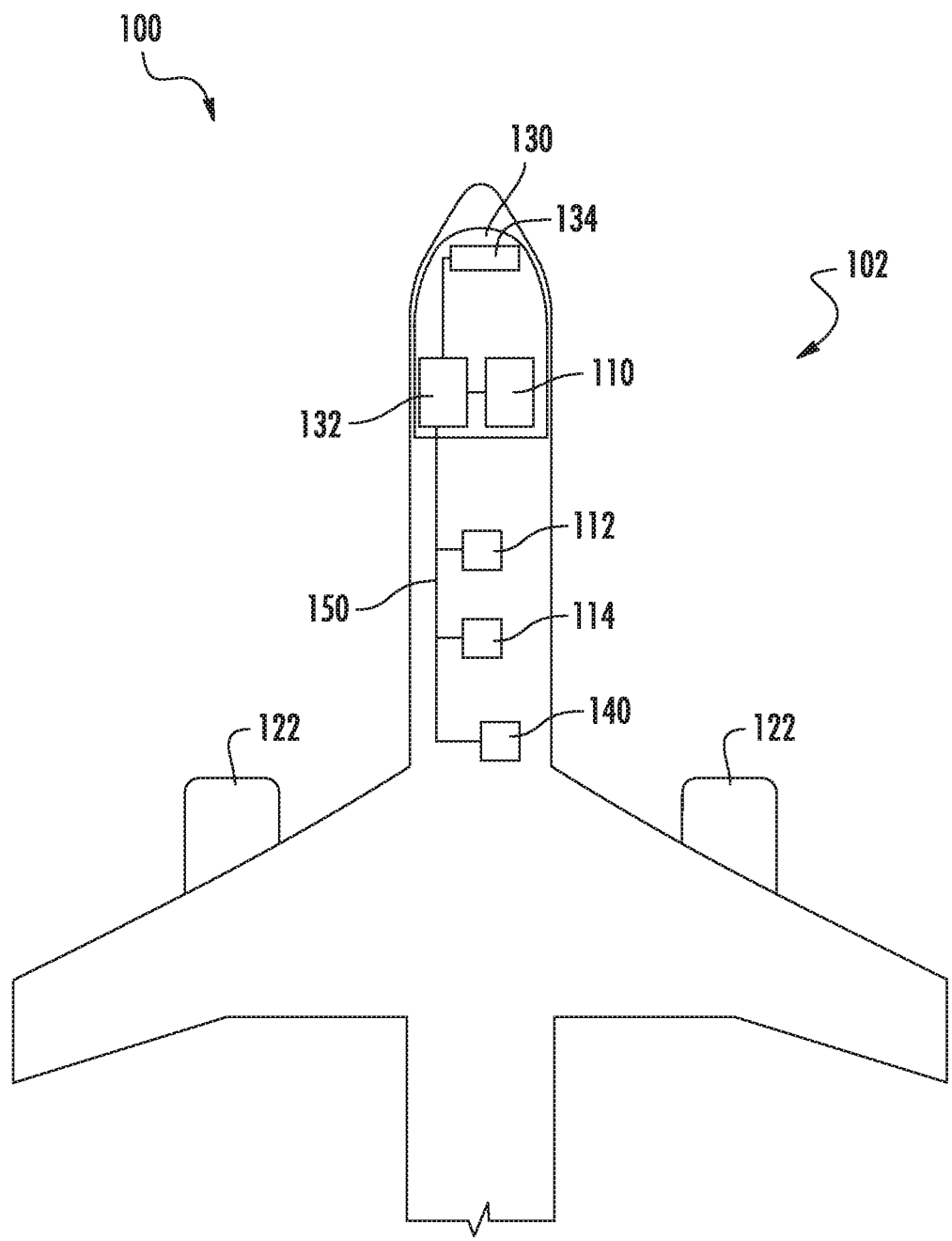
FIG. 1 depicts an example system for determining navigation information for an aircraft according to example embodiments of the present disclosure.

Reference now will be made in detail to embodiments of the invention, one or more example(s) of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed systems and methods for determining navigation information for an aircraft. In some embodiments, a kinematic model (e.g., a model that governs the motion of bodies without consideration of masses of the bodies or the forces causing the motion) can be developed that models geometric position of an aircraft using an analogy with a robotic arm. More particularly, satellite-based positioning signals (e.g., GPS signals) can be used to derive one or more vectors that can be used to develop the kinematic model. A first vector associated with a distance between a satellite and the aircraft can represent one link of the robotic arm. A second vector associated with a distance from a reference point (e.g., a point on the Earth) and the satellite can represent a second link of the robotic arm. The satellite can represent a pivot point for the robotic arm. Translation and attitude information for the aircraft can be solved for simultaneously in a geometric manner using the kinematic model. In this way, a navigation solution can be provided that is purely geometrical and avoids complexities associated with modeling geodesic issues associated with the Earth.

More particularly, in some embodiments, the navigation problem can be represented as a rigid body transformation using the kinematic model. The rigid body transformation can be used to describe the instantaneous position and orientation of an aircraft relative to an inertial frame (e.g., the Earth-Centered, Earth-Fixed (ECEF) coordinate system). As the aircraft flies through the world relative to the inertial frame, the motion of the aircraft can include rotation and translation relative to the inertial frame. In some embodiments, an exponential map can be used to determine an integrated solution that solves for both attitude information and translation information, providing for geometric treatment of the navigation motion. A technical effect of the present disclosure is simplification of the computing time and resources necessary to implement a navigation solution, leading to increased efficiency of flight management systems and planning.

Providing a system that requires less computational strain can allow for the integration of the inertial reference system (e.g., attitude sensors) and the satellite positioning system (e.g., GPS). For instance, in some embodiments, satellite-based positioning signals can include ephemeris data indicative of the location of a satellite with respect to a reference point (e.g., a point on the Earth). Knowledge of the location of the satellite can be used in conjunction with the kinematic model to determine the position and orientation of the aircraft according to example aspects of the present disclosure.

Because the position and orientation of the aircraft can be determined, in some embodiments, using the kinematic model based on the satellite position signals, attitude sensors on the aircraft can be used solely to perform integrity checks to the satellite-based positioning signals. In this regard, less precise satellite-based positioning modules can be used as the data obtained from attitude sensors can be used to validate and check the data of the satellite-based positioning signals without sacrificing computing resources. As a result, attitude sensors and their integration with satellite-based positioning systems can be more easily adapted and/or integrated as a part of a flight management system.

FIG. 1 depicts an example system 100 for determining navigation information for an aircraft 102 according to example embodiments of the present disclosure. The aircraft 102 can include one or more engine(s) 122, a fuselage 124, and a flight management system 130. In some implementations, the engine(s) 122 can be configured as a gas turbine engine. For example, the engine(s) 122 can include a compressor section, a combustion section, and a turbine section in serial flow order. The engine(s) 122 can be configured as a turbofan engine, a turbojet engine, a turboprop engine, a turboshaft engine, etc.

The system 100 can include one or more navigation systems 110 that determine navigation aids and other navigation information for the aircraft 102. For instance the navigation system(s) 110 can be configured to determine the position and orientation of the aircraft 102 and provide predicted positions and orientations of the aircraft 102. In some embodiments, the navigation system 110 can be implemented as part of the flight management system 130 (e.g., as a module of the flight management system 130). In other embodiments, the navigation system 110 can be a separate system from the flight management system 130 and can, for instance, be in communication with the flight management system 130. The navigation system(s) 110 can include or be in communication with various equipment, such as one or more processors, one or more memory devices, a receiver 112 configured to receive satellite-based positioning signals (e.g., GPS signals), inertial measurement unit 114 configured to determine attitude and inertial acceleration information and other information of the aircraft and other equipment used to determine position and orientation of the aircraft 102. The receiver 112 can be any suitable receiver configured to receive and/or process signals from, for instance, satellites (e.g., GPS signals). The inertial measurement unit 114 can include, for instance, sensors including gyroscopes and accelerometers for measuring angular and linear motion.

In some embodiments, the navigation system(s) 110 can include or be based in part on a, for example, a global positioning system (GPS), distance measuring equipment (DME), a VHF Omni-Directional Range (VOR) system, a localizer system, and/or any other navigation system suitable for use with the aircraft 102. One or more component(s) of the navigation system(s) 110 (e.g., receiver, display, other onboard components) can be included with aircraft 102 or can be separate from the aircraft 102.

The flight management system 130 can include one or more computing device(s) 132 and/or one or more other components that form a part of, for instance, an avionics system. The computing device(s) 132 of the flight management system 130 can implement one or more function(s) associated with flight management. For instance, the computing device(s) 132 can implement a flight plan function and/or a predictions function. The flight plan function can include information about a flight plan associated with the aircraft 102. For example, the flight plan function can include information associated with an intended route of the aircraft 102 set forth in the flight plan and/or various waypoints along the intended route of the flight plan (e.g., as calculated or determined, for instance, by the navigation system 110). The predictions function can be configured to estimate one or more parameter(s) associated with the aircraft 102 at future points in the flight plan (e.g., as calculated or determined, for instance, by the navigation system). For example, at each future point and/or time in the flight plan, the predictions function can be configured to estimate, an estimated speed associated with the aircraft 102, an estimated position associated with the aircraft 102, an estimated velocity associated with the aircraft 102, an estimated altitude associated with the aircraft 102, an estimated attitude (e.g., orientation) associated with the aircraft 102, and/or other parameters associated with the aircraft 102. In example embodiments, the flight plan function and/or the predictions function can be implemented at least in part using a kinematic model according to example aspects of the present disclosure.

The computing device(s) 132 can be coupled to a variety of onboard systems 140 included with the aircraft 102 over a network 150. The network 150 can include a data bus or combination of wired and/or wireless communication links. The computing device(s) 132 can be configured to communicate with one or more onboard system(s) 140 associated with the aircraft 102. In some implementations, the onboard system(s) 140 can be configured to perform various aircraft operations and control and/or monitor various settings and parameters associated with the aircraft 102. For instance, the onboard system(s) 140 can be associated with a flight deck system, an alert system, an audio system, a video system, a communications system, a flight recorder, monitoring systems, and/or other systems of the aircraft 102. In some embodiments, the computing device(s) 132 can communicate with a display system 134 having one or more display devices that provides visual information (e.g., visual navigation information) to a user as part of an output of the flight management system.

Figure 2:
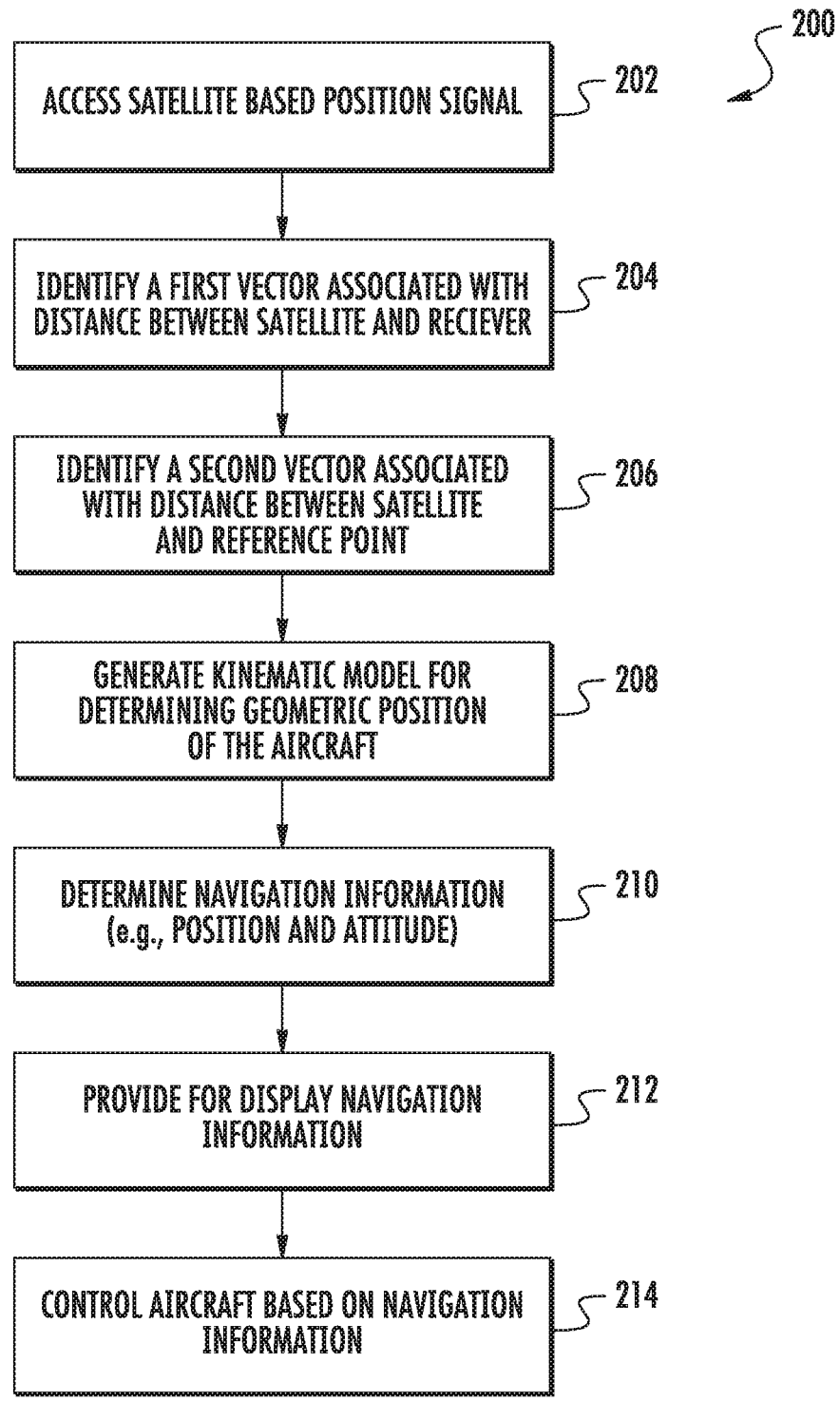
FIG. 2 depicts a flow diagram of an example method according to example embodiments of the present disclosure.

FIG. 2 depicts a flow diagram of an example method (200) of determining navigation information for an aircraft according to example embodiments of the present disclosure. The method (200) can be implemented, for instance, using any suitable aircraft system, such as the system 100 depicted in FIG. 1. FIG. 2 depicts steps performed in a particular order for purposes of illustration and discussion. Those of ordinary skill in the art, using the disclosures provided herein, will understand that various steps or aspects of any of the methods disclosed herein can be modified, adapted, rearranged, omitted, and/or expanded in various ways without deviating from the scope of the present disclosure.

At (202), the method includes accessing one or more satellite-based positioning signals. The satellite-based positioning signals can be, for instance, GPS signals. The satellite-based positioning signals can be received, for instance, at receiver 112 of FIG. 1 and stored in one or more memory devices, such as memory devices associated with the receiver 112, navigation system(s) 110, or computing device(s) 132. The satellite-based positioning signals can include data indicative of a distance between a satellite as well as ephemeris data. The ephemeris data can be indicative of a distance between a reference point on the Earth (e.g., the center of the Earth) and the satellite.

Example aspects of the present disclosure are discussed with respect to processing a single satellite-based positioning signal for purposes of simplicity of discussion. Those of ordinary skill in the art, using the disclosures provided herein, will understand that multiple satellite based positioning signals can be processed in accordance with the present disclosure. For instance, the inventors have discovered that it is advantageous to process four or more satellite-based positioning signals (e.g., GPS signals) according to example embodiments of the present disclosure to achieve increased accuracy of results.

At (204), the method can include identifying a first vector associated with a distance between the satellite and the receiver on the aircraft. For instance, the navigation system 110 of FIG. 1 can determine the first vector based at least in part on the satellite-based positioning signal(s) received at the receiver 112 and/or stored in one or more memory devices. The first vector can include data indicative of a magnitude of the distance between the satellite and the receiver as well as data indicative of the direction from the satellite to the receiver. The first vector can be stored and/or represented in any suitable format, date type, or data structure. In some embodiments, the first vector can be determined, at least in part, using satellite orbit propagation techniques.

Figure 3:
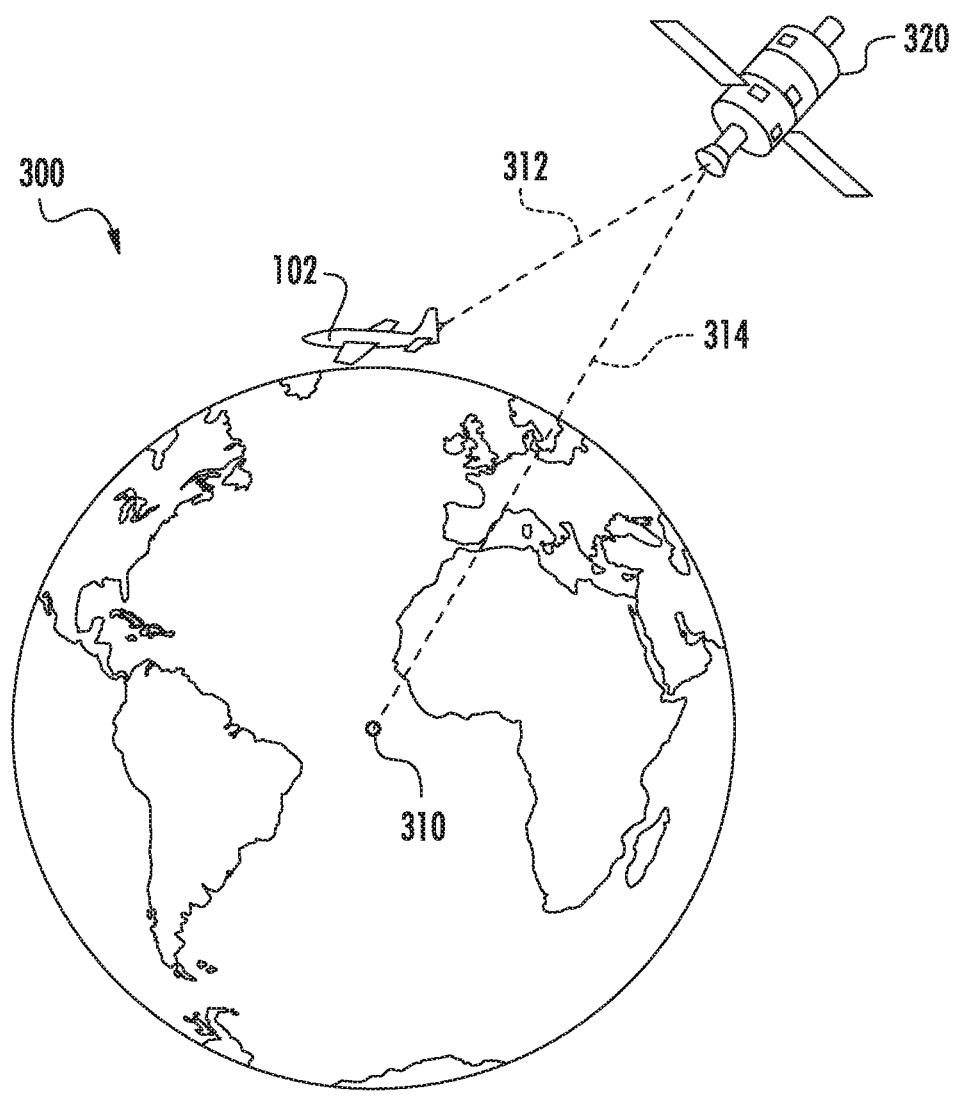
FIG. 3 depicts an illustration of an aircraft with respect to a satellite and the Earth.

FIG. 3 depicts an illustration of an aircraft with respect to a satellite providing a satellite-based positioning signal and the Earth. FIG. 3 illustrates a representation of a first vector 312. As shown, the first vector 312 represents a distance (e.g., both magnitude and direction) between a satellite 320 providing the satellite-based positioning signal and the receiver located on the aircraft 102.

At (206) of FIG. 2, the method includes identifying a second vector associated with a distance between a reference point (e.g., the center of the Earth or other point on the Earth) and the satellite providing the satellite-based positioning signal. For instance, the navigation system 110 of FIG. 1 can determine the second vector based at least in part on the satellite-based positioning signal(s) (e.g., the ephemeris data) received at the receiver 112 and/or stored in one or more memory devices. The second vector can include data indicative of a magnitude of the distance between the satellite and the reference point as well as data indicative of the direction from the satellite to the reference. The first vector can be stored and/or represented in any suitable format, date type, or data structure.

FIG. 3 illustrates a representation of a second vector 314. As shown, the second vector 314 represents a distance (e.g., both magnitude and direction) between a satellite 320 providing the satellite-based positioning signal and a reference point 310. The reference point 310 can be for instance, the center of the Earth or other point on the Earth.

Referring to FIG. 2 at (208), the method can include generating a kinematic model for determining a geometric position of the aircraft using the first vector and the second vector. According to example aspects of the present disclosure, the kinematic model can be based at least in part on a robotic arm. The kinematic model can be stored and/or access in one or more memory devices associated with the navigation system(s) 110, the computing device(s) 132, or other memory devices.

Figure 4:
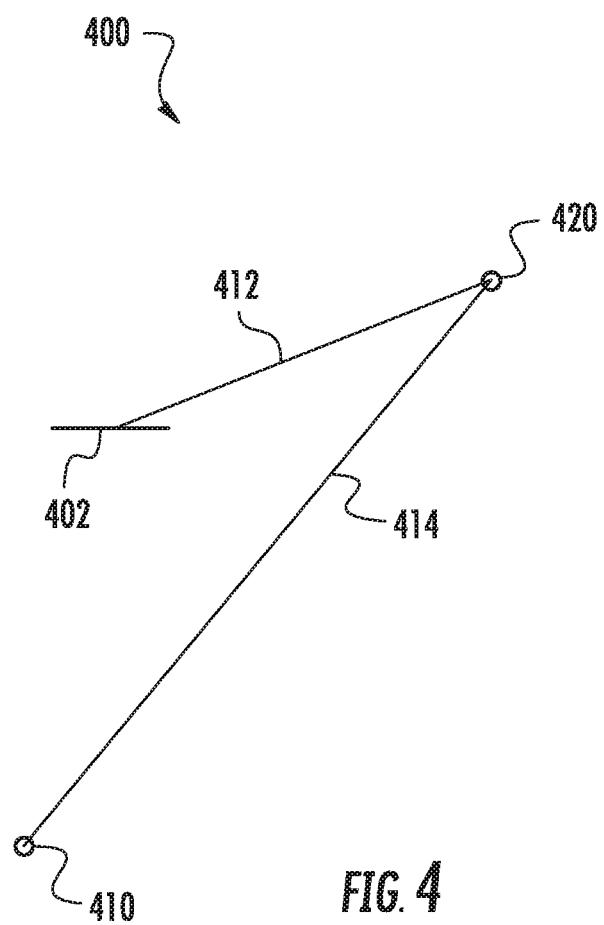
FIG. 4 depicts a representation of an example kinematic model based at least in part on a robotic arm according to example embodiments of the present disclosure.

FIG. 4 depicts a representation of a kinematic model 400 generated based on the aircraft 102 and satellite 320 depicted in FIG. 3 according to example embodiments of the present disclosure. As shown, the kinematic model 400 models the aircraft 102 as an end effector 402 for a robotic arm. The kinematic model 400 models the satellite 320 as a pivot point 420 of the robotic arm. The first vector 312 of FIG. 3 is modeled as a first link 412 of the robotic arm extending between the end effector 402 and the pivot point 420. The second vector 314 of FIG. 3 is modeled as a second link 414 of the robotic arm extending between a base 410 and the satellite 420. The base 410 can model the reference point 310 on the Earth.

Referring to FIG. 2 at (210), the method can include determining navigation information (e.g., translation information and attitude information) based at least in part on the kinematic model. By using the kinematic model, the navigation information can be determined geometrically irrespective of geodesic factors associated with the Earth. In this way, translation and attitude information can be determined simultaneously in a geometric manner without requiring, for instance, two separate algorithms or processing solutions.

In some embodiments, the navigation solution can be posed as a rigid body transformation based at least in part on the kinematic model. A path between waypoints can be constructed similar to a path of coordinates as is done in robotics. In some embodiments, an optimization (e.g., a minimum energy or path optimization) can be performed to determine a most efficient path for a plurality of waypoints using the kinematic model. Altitude restrictions can be implemented as x-, y-, and/or z-coordinate restrictions on the path in the kinematic model.

In some embodiments, the solution can be implemented and/or determined using an exponential map based on, for instance, screw theory. Screw theory states that any rigid motion (e.g., as modeled by the robotic arm) can be represented as a translation and a rotation around an axis. This can provide for the use of exponential coordinates for rigid motions and twists, providing a geometric treatment of the navigation motion modeled by the kinematic model.

Figure 5:
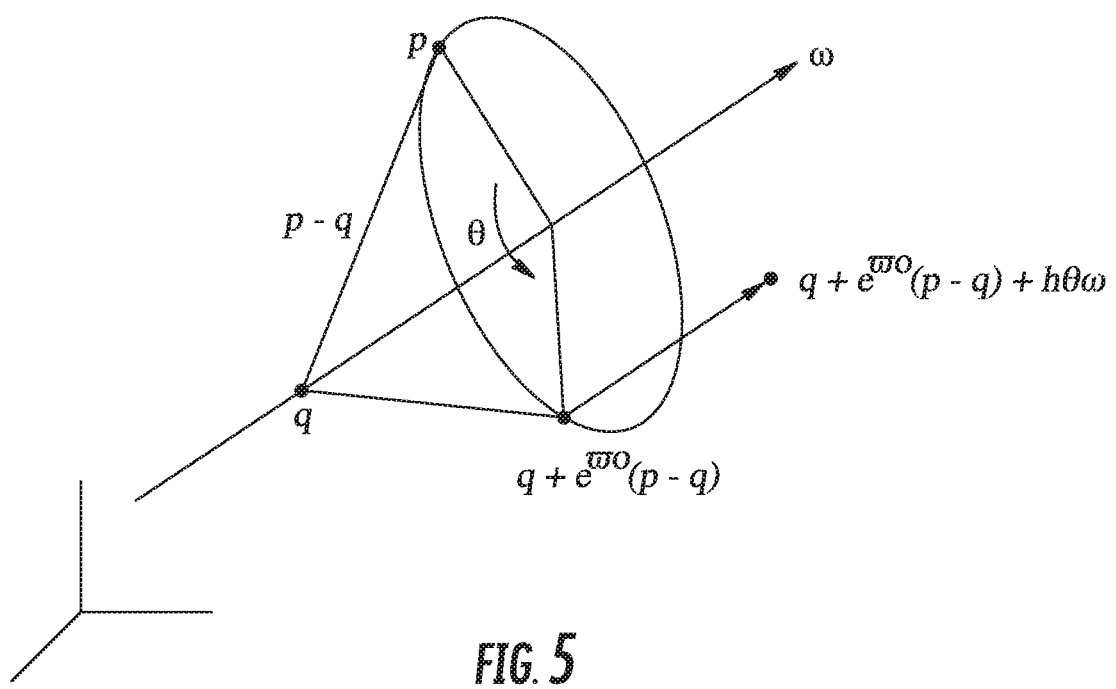
FIG. 5 depicts a representation of motion about an axis as represented by the screw theory.

FIG. 5 depicts a representation of motion about an axis as represented by the screw theory. The rotation of a body can be represented as an exponential map Consider the velocity of a point q attached to the rotation body. Rotating the body at constant unit velocity about the w axis, the velocity of the point q may be written as:

$$\dot{q}(t) = \omega \times q(t) = \hat{w}q(t) \qquad (1)$$

Where:

$$\hat{\omega} = \begin{bmatrix} 0 & -\omega_3 & \omega_2 \\ \omega_3 & 0 & -\omega_1 \\ -\omega_2 & \omega_1 & 0 \end{bmatrix}$$

Since the cross product by w is a linear operator, it can be represented using a matrix. Since equation (1) is a time invariant linear differential equation, it may be integrated to give $$\dot{q}(t) = e^{\hat{w}t}q(0) \qquad (2)$$

Where q(0) is the initial position (t=0) of the point and the exponential matrix is:

$$e^{\hat{w}t} = I + \hat{\omega}t + \frac{(\hat{\omega}t)^2}{2!} + \frac{(\hat{\omega}t)^3}{3!} + \ldots .$$

It follows that if we rotate about the axis w at unit velocity for theta units of time, the net rotation would be given by:

$$R(\omega, \theta) = e^{\hat{\omega}\theta}$$

Because the matrix is skew symmetric (e.g., see Rodrigues formula) the exponential of the matrix can be obtained for computational ease as shown:

$$e^{\hat{\omega}\theta} = I + \hat{\omega}\sin\theta + \hat{\omega}^2(1 - \cos\theta)$$

To merge the translation and rotation in one mathematical entity, we make use of the homogenous representation. Equation 2 can be conveniently converted into homogenous coordinates by defining the 4×4 matrix psi:

$$\hat{\varphi} = \begin{bmatrix} \hat{\omega} & v \\ 0 & 0 \end{bmatrix}$$

With v=w×q. Therefore equation 2 can be rewritten with an extra row append to it as:

$$\begin{bmatrix} \dot{q} \\ 0 \end{bmatrix} = \begin{bmatrix} \hat{\omega} & v \\ 0 & 0 \end{bmatrix} \begin{bmatrix} q \\ 1 \end{bmatrix} = \hat{\varphi} \begin{bmatrix} q \\ 1 \end{bmatrix} \rightarrow \dot{\bar{q}} = \hat{\varphi}\bar{q}$$

Therefore the solution of the differential equation is given by $$\dot{q}(t) = e^{\hat{\varphi}t}q(0)$$

where the exponential is given by the Rodrigues Formula.

In a similar manner, transformation due to translational motion can be as an exponential map. The velocity of a point attached to the body in motion moving with unit velocity is:

$$\dot{p}(t) = v$$

Where the matrix psi will be $$\hat{\varphi} = \begin{bmatrix} 0 & v \\ 0 & 0 \end{bmatrix}$$

And the same procedure occurs.

The matrixes $\hat{\varphi}$ are the generalization of a skew-symmetric matrix that represents a rigid transformation. This element is referred as a twist or infinitesimal generator of the Euclidean group. This matrix can be represented as an R6 vector:

$$\hat{\varphi} = \begin{bmatrix} v \\ \omega \end{bmatrix}$$

To merge both rotation and translation solutions, Screw Theory can be used Consider a body rigid motion which includes rotation about an axis in space through an angle of theta radians, followed by translation along the same axis by an amount d as shown in FIG. 5. This is a screw motion.

The pitch of the screw to be the ratio of translation to rotation h=d/theta, thus the net translational motion after rotation theta radians is h*theta. Therefore to compute the rigid body transformation associated with a screw the point p can be analyzed as shown in in FIG. 5 and the final location of the point is given by:

$$p = q + e^{\hat{\omega}t}(p - q) + h\theta\omega$$

This mathematical relationship can give us the net rigid motion transformation of an aircraft (e.g., both translation and rotation) for determining navigation information using the kinematic model according to example embodiments of the present disclosure. More particularly, the translation and rotation can be extrapolated to determine the velocity and other dynamics of the aircraft.

Due to the different properties of the rotation matrices and of the exponential map, many operations could be simplified (e.g., the use of sine and cosine scalars with multiplication of skew symmetric matrices with a diagonal of zero) and therefore it accounts for easier algorithms and less computational time. For instance, to compute the navigational solution, a vector of six elements can be stored and mapped to a homogenous representation using the exponential map.

In addition, in some embodiments, knowledge of the wander angle and navigational frame are not necessary to implement the navigation solution, as the inertial frame is the reference frame (e.g., the reference frame based on the Earth). As a result, continuous rotation of the navigation frame according with the latitude rate of change would not be necessary. Therefore, the use of a wander angle or the wander-azimuth frame would not be necessary, as the body frame would be rotating with respect with an inertial frame that does not change.

Referring back to FIG. 2, once the navigation information has been determined, the method can include providing for display the navigation information on one or more display devices as shown at (212). For instance, the navigation information can be provided for display one or more display devices that are part of the display system 134. The navigation information can be provided through other suitable output devices, such as in audio format through an audio output device (e.g., one or more speakers). The navigation information can be used by a pilot or other operator to assist with navigation of the aircraft. In some embodiments, the display devices are not part of the aircraft and are located remotely from the aircraft. For instance, for unmanned aircraft, the navigation information can be provided for display on a display device at a location of an operator of the unmanned aircraft.

At (214), the method can include controlling the aircraft based at least in part on the determined navigation information. For instance, the flight management system 130 of FIG. 1 can implement an auto-pilot function based at least in part on the determined navigation information. In this way, the auto-pilot function can be improved by accessing navigation information determined in a more computationally efficient manner.

Figure 6:
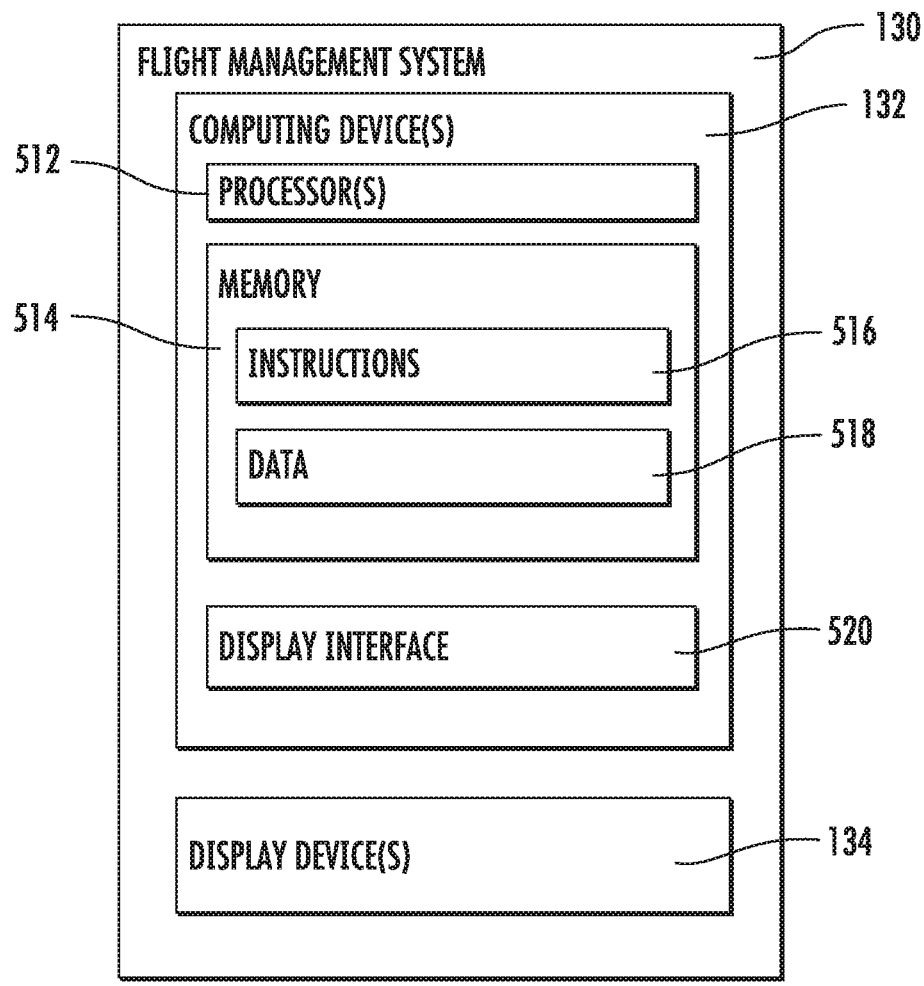
FIG. 6 depicts a computing system for implementing one or more aspects according to example embodiments of the present disclosure.

FIG. 6 depicts a block diagram of an example computing system that can be used to implement the flight management system 130 or other systems of the aircraft according to example embodiments of the present disclosure. As shown, the flight management system 130 can include one or more computing device(s) 132. The computing device(s) 132 can include one or more processor(s) 512 and one or more memory device(s) 514. The one or more processor(s) 512 can include any suitable processing device, such as a microprocessor, microcontroller, integrated circuit, logic device, or other suitable processing device. The one or more memory device(s) 514 can include one or more computer-readable media, including, but not limited to, non-transitory computer-readable media, RAM, ROM, hard drives, flash drives, or other memory devices.

The one or more memory device(s) 514 can store information accessible by the one or more processor(s) 512, including computer-readable instructions 516 that can be executed by the one or more processor(s) 516. The instructions 516 can be any set of instructions that when executed by the one or more processor(s) 512, cause the one or more processor(s) 512 to perform operations. The instructions 516 can be software written in any suitable programming language or can be implemented in hardware. In some embodiments, the instructions 516 can be executed by the one or more processor(s) 512 to cause the one or more processor(s) 512 to perform operations, such as the operations for determining navigation information, as described with reference to FIG. 2, and/or any other operations or functions of the one or more computing device(s) 132.

The memory device(s) 514 can further store data 518 that can be accessed by the processors 512. For example, the data 518 can include a navigational database, data associated with the navigation system(s), data associated with the onboard systems 140, data indicative of a flight plan associated with the aircraft 102, and/or any other data associated with aircraft 120, as described herein. The data 518 can include one or more table(s), function(s), algorithm(s), model(s), equation(s), etc. for determining navigation information according to example embodiments of the present disclosure. For instance, in one example implementation, the data 518 can include a kinematic model generated according to example embodiments of the present disclosure.

The computing device(s) 132 can also include a communication interface 520 used to communicate, for example, with the other components of system. The network interface 520 can include any suitable components for interfacing with one or more network(s), including for example, transmitters, receivers, ports, controllers, antennas, or other suitable components.

The technology discussed herein makes computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of determining navigation information for an aircraft, comprising:

accessing, by one or more processors, a satellite-based positioning signal received at a receiver on an aircraft, the satellite-based positioning signal comprising data indicative of a distance between a satellite and the receiver;

identifying, by the one or more processors, from the satellite-based positioning signal a first vector associated with the distance and direction between the satellite and the receiver;

identifying, by the one or more processors, from the satellite-based positioning signal a second vector associated with a distance and direction between a reference point and the satellite;

generating, by the one or more processors, a kinematic model for determining a geometric position of the aircraft using the first vector and the second vector, the kinematic model based at least in part on a robotic arm, wherein the aircraft is modeled as an end effector for the robotic arm, the satellite is modeled as a pivot point of the robotic arm, the first vector is modeled as a link extending between the pivot point and the end effector, the second end vector is modeled as a link extending between a base and the pivot point; and determining, by the one or more processors, navigation information for the aircraft based at least in part on the kinematic model; and wherein determining navigation information comprises determining translation and attitude information simultaneously in a geometric manner.

2. The computer-implemented method of claim 1, wherein the navigation information for the aircraft is determined geometrically using the kinematic model.

3. The computer-implemented method of claim 1, wherein the navigation information for the aircraft is determined irrespective of geodesic factors associated with the Earth.

4. The computer-implemented method of claim 1, wherein the navigation information comprises a navigation path for the aircraft.

5. The computer-implemented method of claim 4, wherein the navigation path is constructed using the kinematic model using a reduced energy optimization algorithm.

6. The computer-implemented method of claim 4, wherein the navigation path is determined using one or more waypoints, each waypoint operating as a restriction in determination of the navigation path.

7. The computer-implemented method of claim 4, wherein the navigation path is determined using one or more altitude restrictions.

8. The computer-implemented method of claim 5, wherein the navigation information is determined using an exponential map.

9. The computer-implemented method of claim 1, wherein the navigation information comprises translation information and attitude information for the aircraft, and
wherein the translation information and attitude information are used to validate one or more datums from one or more satellite-based positioning signals.

10. The computer-implemented method of claim 1, wherein the reference point comprises a point on the Earth, and
wherein identifying a second vector further comprises ephemeris data indicative of the location of a satellite with respect to the point on the Earth.

11. The computer-implemented method of claim 8, wherein the method comprises providing for display, by the one or more processors, the navigation information as an output of a flight management system, and
wherein the navigation information comprises at least one of aircraft attitude information and aircraft velocity information.

12. The computer-implemented method of claim 1, wherein the method comprises controlling, by a flight management system, navigation of the aircraft based at least in part on the navigation information determined using the kinematic model, and
wherein the navigation information comprises at least one of aircraft attitude information and aircraft velocity information.

13. A flight management system for an aircraft, the flight management system comprising:
one or more processors; and
one or more memory devices, the one or more memory devices storing computer-readable instructions that when executed by the one or more processors cause the one or more processors to perform operations, the operations comprising:
accessing a satellite-based positioning signal received at a receiver on an aircraft, the satellite-based positioning signal indicative of a distance between a satellite and the receiver;
identifying from the satellite-based positioning signal a first vector associated with a distance and direction between the satellite and the receiver;
identifying a second vector from the satellite-based positioning signal associated with a distance and direction between a reference point and the satellite;
generating a kinematic model for determining a geometric position of the aircraft using the first vector and the second vector; and
determining navigation information geometrically for the aircraft based at least in part on the kinematic model using an exponential map;
wherein the kinematic model models the aircraft as an end effector for a robotic arm, the satellite is modeled as a pivot point of the robotic arm, the first vector is modeled as link extending between the pivot point and the end effector, the second vector is modeled as a link extending between a base and the pivot point,
wherein determining navigation information comprises determining translation and attitude information simultaneously in a geometric manner.

14. The flight management system of claim 13, wherein the operations further comprise providing for display navigation information on one or more display devices.

15. The flight management system of claim 13, wherein the operations further comprise controlling navigation of the aircraft based at least in part on the navigation information determined using the kinematic model.

16. An aircraft, comprising:
one or more display systems configured to provide information to a flight crew member of the aircraft; and
a flight management system comprising one or more processors and one or more memory devices, the one or more memory devices storing computer-readable instructions that when executed by the one or more processors cause the one or more processors to perform operations, the operations comprising:
accessing a satellite-based positioning signal received at a receiver on an aircraft, the satellite-based positioning signal indicative of a distance between a satellite and the receiver;
identifying from the satellite-based positioning signal a first vector associated with a distance between the satellite and the receiver;
identifying a second vector from the satellite-based positioning signal associated with a distance between a reference point and the satellite;
generating a kinematic model for determining a geometric position of the aircraft based at least in part on a robotic arm using the first vector and the second vector; and
determining navigation information for the aircraft based at least in part on the kinematic model;
wherein the kinematic model models the aircraft as an end effector for a robotic arm, the satellite is modeled as a pivot point of the robotic arm, the first vector is modeled as link extending between the pivot point and the end effector, the second vector is modeled as a link extending between a base and the pivot point;
wherein the navigation information is provided for display of a display device associated with the display system;
wherein determining navigation information comprises determining translation and attitude information simultaneously in a geometric manner.

17. The aircraft of claim 16, wherein the flight management system is configured to control navigation of the aircraft based at least in part on the navigation information determined based at least in part on the kinematic model.

* * * * *